US012450258B2

(12) United States Patent
Zhu

(10) Patent No.: US 12,450,258 B2
(45) Date of Patent: Oct. 21, 2025

(54) DATA SYNCHRONIZATION METHOD AND SYSTEM BASED ON BLOCKCHAIN, AND RELATED DEVICE

(71) Applicant: Tencent Technology (Shenzhen) Company Limited, Shenzhen (CN)

(72) Inventor: Gengliang Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 187 days.

(21) Appl. No.: 17/965,664

(22) Filed: Oct. 13, 2022

(65) Prior Publication Data

US 2024/0232223 A1    Jul. 11, 2024

Related U.S. Application Data

(63) Continuation of application No. PCT/CN2021/126276, filed on Oct. 26, 2021.

(30) Foreign Application Priority Data

Dec. 10, 2020  (CN) .......................... 202011433372.5

(51) Int. Cl.
G06F 16/00       (2019.01)
G06F 16/22       (2019.01)
(Continued)

(52) U.S. Cl.
CPC ........ *G06F 16/273* (2019.01); *G06F 16/2246* (2019.01); *G06F 16/2379* (2019.01)

(58) Field of Classification Search
CPC . G06F 16/273; G06F 16/2379; G06F 16/2246
(Continued)

(56) References Cited

U.S. PATENT DOCUMENTS 11,327,949 B2 *   5/2022   Maccanti ............ G06F 11/1464
2018/0101701 A1   4/2018   Barinov et al.
(Continued)

FOREIGN PATENT DOCUMENTS

CN        102075408 A     5/2011
CN        106055597 A    10/2016
(Continued)

OTHER PUBLICATIONS

Tencent Technology, ISR, PCT/CN2021/126276, Dec. 30, 2021, 3 pgs.
(Continued)

*Primary Examiner* — Monica M Pyo
(74) *Attorney, Agent, or Firm* — Morgan, Lewis & Bockius LLP

(57) ABSTRACT

The present disclosure provides a data synchronization method performed by a blockchain. The blockchain includes a hierarchical structure composed of a consensus node, a first service node and a second service node. The method includes: receiving, by the first service node, block header data issued, according to the hierarchical structure, by the consensus node; downloading, by the first service node, transaction hash data according to the block header data; receiving, by the first service node, a buffer mapping table of the second service node; and receiving, by the first service node according to the buffer mapping table of the second service node, the transaction content data transmitted by the second service node and corresponding to a storage index. The technical solution of this embodiment of the present disclosure can achieve a blockchain system having a segregation demand and an efficient and secure data synchronization solution in the system.

20 Claims, 8 Drawing Sheets

(51) Int. Cl.
*G06F 16/23* (2019.01)
*G06F 16/27* (2019.01)

(58) Field of Classification Search
USPC .......................................................... 707/615
See application file for complete search history.

(56) References Cited

U.S. PATENT DOCUMENTS

| | | | |
|---|---|---|---|
| 2019/0182029 A1 | 6/2019 | Yim et al. | |
| 2019/0245680 A1* | 8/2019 | Boutaba | H04L 9/0637 |
| 2019/0306235 A1* | 10/2019 | Veale | H04L 63/123 |

FOREIGN PATENT DOCUMENTS

| | | | | |
|---|---|---|---|---|
| CN | 106506638 A | | 3/2017 | |
| CN | 109636388 A | | 4/2019 | |
| CN | 110489486 A | | 11/2019 | |
| CN | 110520884 A | * | 11/2019 | ......... G06F 16/1805 |
| CN | 110602239 A | * | 12/2019 | ............. G06F 21/64 |
| CN | 110800255 A | | 2/2020 | |
| CN | 111130801 A | * | 5/2020 | |
| CN | 111159289 A | | 5/2020 | |
| CN | 112235420 A | | 1/2021 | |
| WO | WO 2020114350 A1 | | 6/2020 | |

OTHER PUBLICATIONS

Tencent Technology, WO, PCT/CN2021/126276, Dec. 30, 2021, 5 pgs.
Tencent Technology, IPRP, PCT/CN2021/126276, Jun. 13, 2023, 6 pgs.
Tencent Technology, Extended European Search Report and Supplementary Search Report, EP Patent Application No. 21902245.6, Jan. 3, 2024, 10 pgs.

* cited by examiner

DATA SYNCHRONIZATION METHOD AND SYSTEM BASED ON BLOCKCHAIN, AND RELATED DEVICE

CROSS-REFERENCE TO RELATED APPLICATIONS

This application is a continuation application of PCT Patent Application No. PCT/CN2021/126276, entitled "DATA SYNCHRONIZATION METHOD AND SYSTEM BASED ON BLOCKCHAIN, AND RELATED DEVICE" filed on Oct. 26, 2021, which claims priority to Chinese Patent Application No. 202011433372.5, filed with the State Intellectual Property Office of the People's Republic of China on Dec. 10, 2020, and entitled "DATA SYNCHRONIZATION METHOD AND SYSTEM BASED ON BLOCKCHAIN, AND RELATED DEVICE", all of which are incorporated herein by reference in their entirety.

FIELD OF THE TECHNOLOGY

The present disclosure relates to the field of computer data processing, specifically to a data synchronization method and system based on a blockchain, an electronic device and a computer-readable medium.

BACKGROUND OF THE DISCLOSURE

When a blockchain is used in some scenarios of the government or commercial institutions, such as a management scenario of electronic tax invoices, not all blockchains participating nodes have sufficient resources and necessity to become nodes participating in blockchain consensus. For the sake of data security, when data related to personal privacy or national security is involved in a blockchain system, it is not suitable for using a general data peer to peer blockchain deployment method. Based on the above problems, how to apply a blockchain technology to some scenarios of the government or commercial institutions, and how to realize data synchronization and deployment methods suitable for scenarios where not all blockchain participating nodes are required to participate in consensus will be a problem worth being studied.

Therefore, there is a need for a new blockchain-based data synchronization method and system, an electronic device and a computer-readable medium.

SUMMARY

Embodiments of the present disclosure provide a data synchronization method and system based on a blockchain, an electronic device and a computer-readable medium, which can achieve a blockchain system having a segregation demand and an efficient and secure data synchronization solution in this system.

Other features and advantages of the present disclosure become obvious through the following detailed descriptions, or may be partially learned partially through the practice of the present disclosure.

In one aspect, an embodiment of the present disclosure provides a data synchronization method performed by a blockchain, the blockchain including a hierarchical structure composed of a consensus node, a first service node and a second service node, the consensus node being a root node in the hierarchical structure, and the first service node and the second service node being descendant nodes of the consensus node; the method including: receiving, by the first service node, block header data issued, according to the hierarchical structure, by the consensus node; downloading, by the first service node, transaction hash data according to the block header data; receiving, by the first service node, a first buffer mapping table of the second service node, the first buffer mapping table comprising a correspondence relationship between the transaction hash data and a local storage index of transaction content data at the second service node; and receiving, by the first service node according to the first buffer mapping table, the transaction content data stored in the storage index corresponding to the transaction hash data from the second service node.

In another aspect, an embodiment of the present disclosure provides a data synchronization system based on a blockchain, the data synchronization system based on a blockchain including a hierarchical structure composed of a consensus node, a first service node and a second service node, the consensus node being a root node in the hierarchical structure, and the first service node and the second service node being descendant nodes of the consensus node; wherein the consensus node is configured to issue block header data according to the hierarchical structure; the second service node is configured to transmit a buffer mapping table of the second service node to the first service node, the buffer mapping table comprising a correspondence relationship between the transaction hash data and a local storage index of transaction content data at the second service node; the first service node is configured to receive the block header data issued, according to the hierarchical structure, by the consensus node; download transaction hash data according to the block header data; receive the buffer mapping table of the second service node; receive, according to the buffer mapping table, the transaction content data stored in the storage index corresponding to the transaction hash data from the second service node.

An embodiment of the present disclosure provides an electronic device, including: at least one processor; and a storage apparatus, configured to store at least one program, the at least one program, when executed by the at least one processor, causing the at least one processor to implement the data synchronization method performed by a blockchain described in the foregoing aspect.

An embodiment of the present disclosure provides a non-transitory computer-readable medium, storing a computer program, the computer program, when executed by a processor, implementing the data synchronization method performed by a blockchain described in the foregoing aspect.

In another aspect, an embodiment of the present disclosure provides a computer program product including instructions, the instructions, when run on a computer, causing the computer to perform the data synchronization method performed by a blockchain described in the foregoing aspect.

In the technical solutions provided by some embodiments of the present disclosure, the block header data is issued to the first service node according to the hierarchical structure formed by the consensus node, the first service node and the second service node, so that certain connectivity between the consensus node and the service nodes (the first service node and the second service node) can be ensured, and excessive connection between the service nodes and the consensus node can be prevented. A consensus node serving as a root node issues block header data to a descendant node serving as a consensus node, so that the block header data can be quickly issued. Downloading the transaction hash data is triggered according to the block header data, and the second service node transmits the transaction content data to the first service node, so that the performance of a peer to peer network can be fully used, and the network consumption of consensus nodes by service nodes can be reduced, ensuring that a non-core data request of the blockchain will not affect normal consensus block production.

It is to be understood that the foregoing general descriptions and the following detailed descriptions are merely for illustration and explanation purposes and are not intended to limit the present disclosure.

DESCRIPTION OF EMBODIMENTS

Exemplary implementations are now described more comprehensively with reference to the accompanying drawings. However, the examples of implementations may be implemented in multiple forms, and it should not be understood as being limited to the examples of implementations described herein. Conversely, the implementations are provided to make the present disclosure more comprehensive and complete, and comprehensively convey the idea of the examples of the implementations to a person skilled in the art.

In addition, the described features, structures, or characteristics may be combined in one or more embodiments in any appropriate manner. In the following descriptions, more specific details are provided to provide a comprehensive understanding of the embodiments of the present disclosure. However, a person skilled in the art is to be aware that, the technical solutions in the present disclosure may be implemented without one or more of the specific details, or another method, unit, apparatus, system or step may be used. In other cases, well-known methods, apparatuses, systems, implementations, or operations are not shown or described in detail, to avoid obscuring aspects of the present disclosure.

The block diagrams shown in the accompany drawings are merely functional entities and do not necessarily correspond to physically independent entities. That is, the functional entities may be implemented in a software form, or in at least one hardware module or integrated circuit, or in different networks and/or processor apparatuses and/or microcontroller apparatuses.

The flowcharts shown in the accompanying drawings are merely examples for descriptions, do not need to include all content and operations/steps, and do not need to be performed in the described orders either. For example, some operations/steps may be further divided, while some operations/steps may be combined or partially combined. Therefore, an actual execution order may change according to an actual case.

The system involved in the related art may be a distributed system formed by a client and a plurality of nodes (any form of computing device in an access network, such as a server and a user terminal) connected in the form of network communication.

Figure 1:
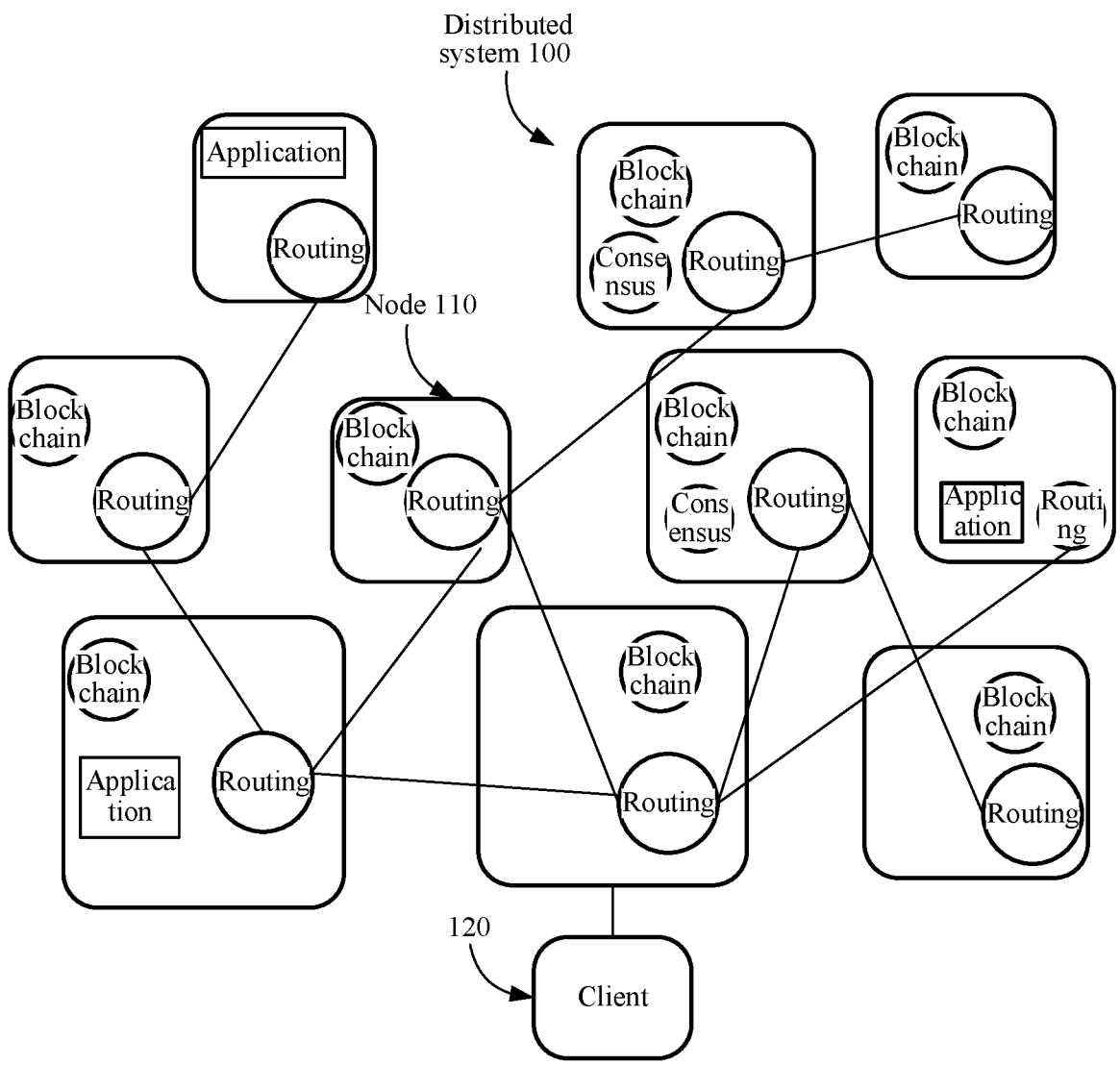
FIG. 1 is an exemplary schematic structural diagram of application of a distributed system provided according to the related technology to a blockchain system.

Taking the distributed system as the blockchain system for example, FIG. 1 is an exemplary schematic structural diagram of application of a distributed system 100 provided according to the related technology to a blockchain system, formed by the plurality of nodes 110 (any form of computing device in an access network, such as a server and a user terminal) and the client 120. A peer-to-peer (P2P) network is formed between nodes. A P2P protocol is an application layer protocol running on top of the transmission control protocol (TCP). In the distributed system, any machine such as a server and a terminal can join to become a node, and the node includes a hardware layer, a middle layer, an operating system layer and an application layer.

Referring to functions of each node in the blockchain system shown in FIG. 1, the involved functions include the following.

1) A routing, a basic function of a node, which is used for supporting communication between nodes.

In addition to the routing function, the node can also have the following functions.

2) An application, which is used for being deployed in the blockchain to implement a specific business according to actual business needs, record data related to the realization of the function to form record data, carry digital signatures in the record data to indicate the source of task data, and send the record data to other nodes in the blockchain system for other nodes to add the record data to a temporary block when the source and integrity of the record data are successfully verified by other nodes.

For example, the business implemented by the application is as follows.

2.1) A wallet, which is used for providing a function of conducting electronic currency transactions, including initiating transactions, that is, sending transaction records of current transactions to other nodes in the blockchain system. After the verification of other nodes is successful, the record data of the transaction is stored in a temporary block of the blockchain as a response to acknowledging that the account data is valid. Certainly, the wallet further supports inquiring remaining electronic money in an electronic money address.

2.2) A shared ledger, which is used for providing functions such as storage, query and modification of account data. The record data of the operation of the account data is sent to other nodes in the blockchain system. After the other nodes verify that the account data is valid, the record data is stored in a temporary block as a response to acknowledging that the account data is valid, and a confirmation can also be sent to the node that initiates the operation.

2.3) A smart contract, a computerized agreement that can execute the terms of a contract, which is implemented by a code deployed on the shared ledger for execution when a certain condition is met, and the code is used for completing automated transactions according to actual business needs. For example, the logistics status of the goods purchased by the buyer is checked, and the electronic currency of the buyer is transferred to the address of the merchant after the buyer signs for the goods. Certainly, the smart contract can also execute a contract for processing received information in addition to executing a contract for transactions.

3) A blockchain, including a series of blocks that follow each other in a chronological order. Once a new block is added to the blockchain, it will not be removed. The block records the record data submitted by the nodes in the blockchain system.

Figure 2:
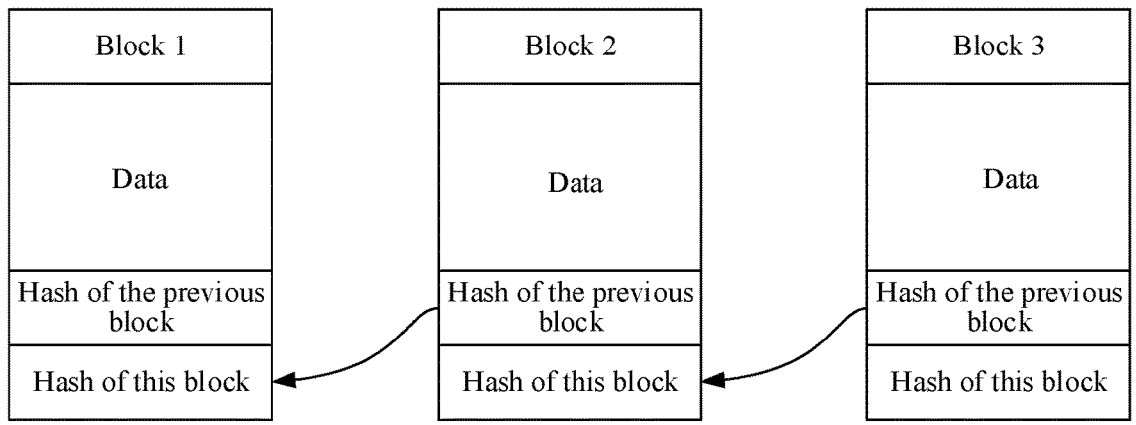
FIG. 2 is an exemplary schematic diagram of a block structure provided according to the related technology.

FIG. 2 is an exemplary schematic diagram of a block structure provided according to the related technology. Each block includes the hash value of the transaction record stored in this block (the hash value of this block) and the hash value of the previous block, and each block is connected by the hash value to form a blockchain. In addition, the block may also include information such as a timestamp when the block is generated. The blockchain is essentially a decentralized database and is a string of data blocks generated through association by using a cryptographic method. Each data block includes relevant information, the information being used for verifying the validity of information of the data block (anti-counterfeiting) and generating a next data block.

In the related technology, it refers to a peer to peer (P2P) network in which there is no need for a central node to maintain the network state between network nodes on the basis of a specific type of network protocol, but each node maintains states of nodes in the whole network or the connected state with an adjacent node by means of broadcasting interaction with the adjacent node.

In related technology, blockchain technologies of public blockchain and consortium blockchain often adopt P2P schemes. In some public blockchain networks, one node can transmit a peer list maintained by itself to an adjacent node. Therefore, after an initial node finds the peer list, a node list is required to be copied from the adjacent node. In some other public blockchain networks, all nodes in the networks use specific algorithms (such as Kademlia and Kad) to achieve fast and accurate routing and positioning data problems. In the blockchain technology of the consortium blockchain, a data encapsulation network can be based on the Gossip protocol. A Gossip process is initiated by a child node. When one child node has a state that is required to be updated to other nodes in the network, several surrounding nodes will be randomly selected to spread a message. Nodes that receive the message will also repeat this process, until finally all the nodes in the network have received the message.

However, the above-mentioned P2P schemes for related blockchain products are all applied to a single-layer network. All nodes in the network are applicable to a unified P2P scheme, i.e. node to node. All the nodes are positioned in the same network. During adaptation to an industrial blockchain with a higher confidentiality requirement for data transmission, since the related P2P networks have low performance corresponding to their blockchain products, under higher-performance blockchain products, the single-layer blockchain will not be able to guarantee efficient execution of a core consensus algorithm.

For example, when the above methods are applied to some scenarios of the government or commercial institutions, such as separation of internal and external networks, service networks, and office networks, the confidentiality and security of data related to personal privacy or national security in a blockchain system cannot be guaranteed. Furthermore, the possibility that some participating nodes do not need to participate in consensus cannot be considered. In the case where all nodes participate in the consensus, since all the nodes need to exchange data, it will inevitably lead to a large data exchange amount. The large data exchange amount will definitely affect the efficient execution of the core consensus algorithm, which in turn affects the normal consensus block production of consensus nodes.

Figure 3:
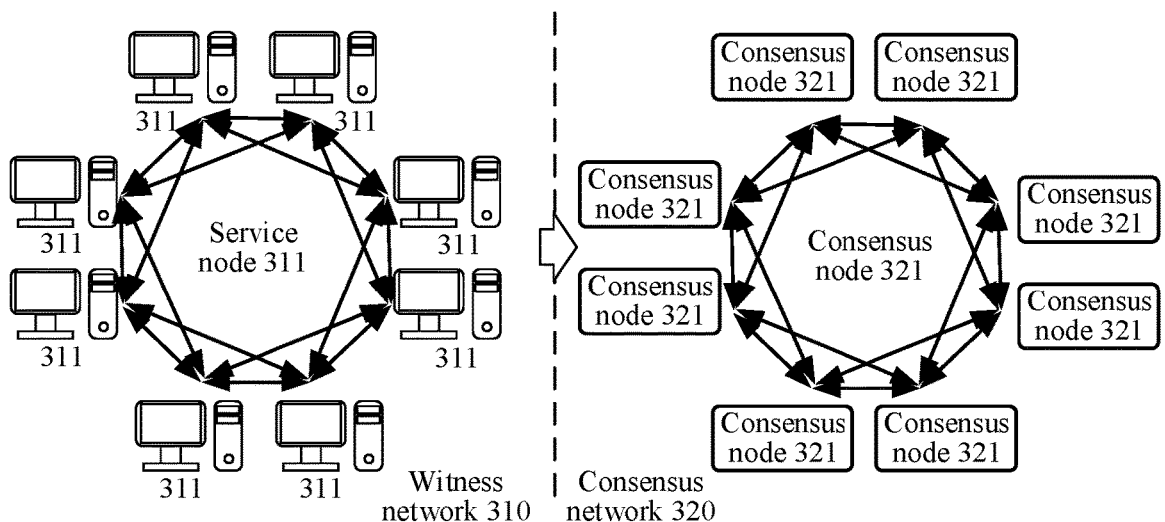
FIG. 3 schematically shows an exemplary schematic structural diagram of a blockchain system provided according to an embodiment of the present disclosure.

FIG. 3 schematically shows an exemplary schematic structural diagram of a blockchain system provided according to an embodiment of the present disclosure. As shown in FIG. 3, the blockchain system may be divided into a witness network 310 and a consensus network 320. The witness network 310 includes a service node 311, and the consensus network 320 includes a consensus node 321. The service node 311 in the witness network mainly performs service execution, without participating in accounting consensus, and acquires block header data and some block data authorized to be read from the consensus network by means of identity authentication. The service node in the witness network does not participate in the core consensus algorithm, and the service node in the witness network is verified by witness. Witnessing in virtual currency transactions refers to verifying the legitimacy of a transaction. A segregated witness (SegWit) algorithm can be used for witnessing. The main idea of the SegWit algorithm is to reorganize block data so that signatures are no longer stored with transaction data. In other words, SegWit includes segregating verifiers (signatures) from transaction data. This stores more transactions in a single block, thereby increasing the transaction throughput of the network. The witness network and the consensus network are in different network environments. Generally speaking, the witness network is in a public network, and the consensus network is in a private network.

The service node is deployed in the public witness network, while an accounting node (i.e., the consensus node in FIG. 3) running the blockchain consensus protocol is deployed in the private consensus network. The service node and the accounting node interact through a routing boundary:

Since the consensus network is located in a relatively secure private cloud, and there is a consensus mechanism for mutual access to ensure the security, additional identity management and network control are not required. The service node is in the public network and may be accessed by other uncertain network terminals. Therefore, the behavior that the service nodes and other possible nodes access the consensus network needs to be strictly controlled. Based on the above deployment methods, a blockchain system with higher data security in scenarios with data confidentiality requirements can be achieved.

Figure 4:
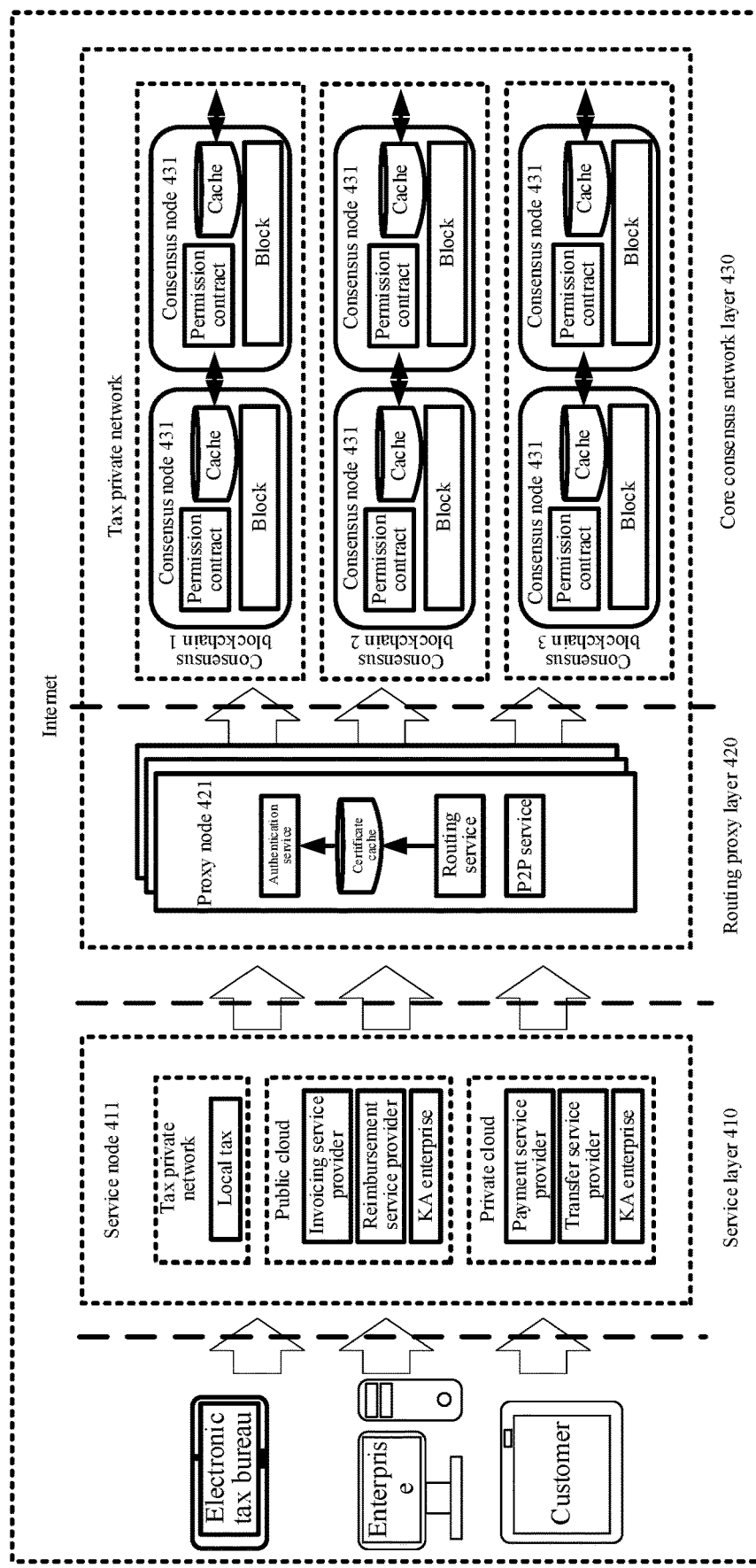
FIG. 4 is a schematic systematic diagram of the blockchain system shown in FIG. 3 in an electronic invoice service scenario.

FIG. 4 is a schematic systematic diagram of the blockchain system shown in FIG. 3 in an electronic invoice service scenario. As shown in FIG. 4, a service layer 410 is located in the witness network and will submit a service operation interaction to a consensus layer. The service layer 410, a routing proxy layer 420, and a core consensus network layer 430 (the foregoing consensus network) form an entire complete blockchain service system. The routing proxy layer plays a segregation role for the service layer and the core consensus network layer.

Figure 6:
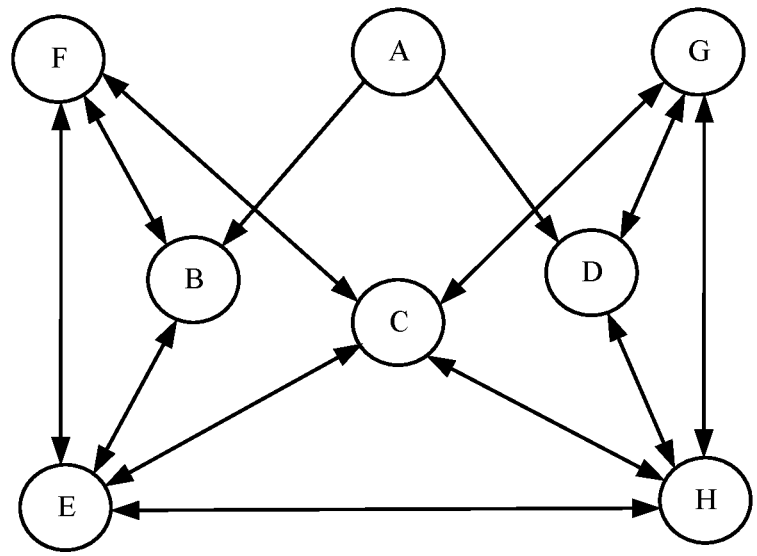
FIG. 6 schematically shows a schematic structural diagram of a hierarchical structure provided according to an exemplary embodiment of the present disclosure.

FIG. 6 schematically shows a schematic structural diagram of a hierarchical structure provided according to an exemplary embodiment of the present disclosure. As shown in FIG. 6, the hierarchical structure of this embodiment of the present disclosure may include consensus nodes A, G, and F serving as root nodes, and service nodes B, C, D, E, and H serving as descendant nodes of the consensus nodes. The consensus nodes are configured to participate in a core consensus mechanism. A first service node referred to in this embodiment of the present disclosure may be any one of the descendant nodes of the consensus nodes, and a second service node may be any one of the descendant nodes of the consensus nodes that is different from the first service node. Preferably, in the hierarchical structure of this embodiment of the present disclosure, A, G, and F are at a first layer in the hierarchical structure. B, C, and D are at a second layer in the hierarchical structure, and E and H are at a third layer in the hierarchical structure. Two connected nodes at adjacent layers are father and child nodes of each other. For example, nodes B and C are father nodes of node E, and node E is a child node of nodes B and C. Preferably, one service node can also be randomly connected to a father node of a father node. For example, node E of the third layer is connected to node F of the first layer. Node F is not the father node of node E, but Node F is actually the father node of the father node of node E, and is an ancestor node additionally connected to node E. This connection method can make the network more robust.

Figure 5:
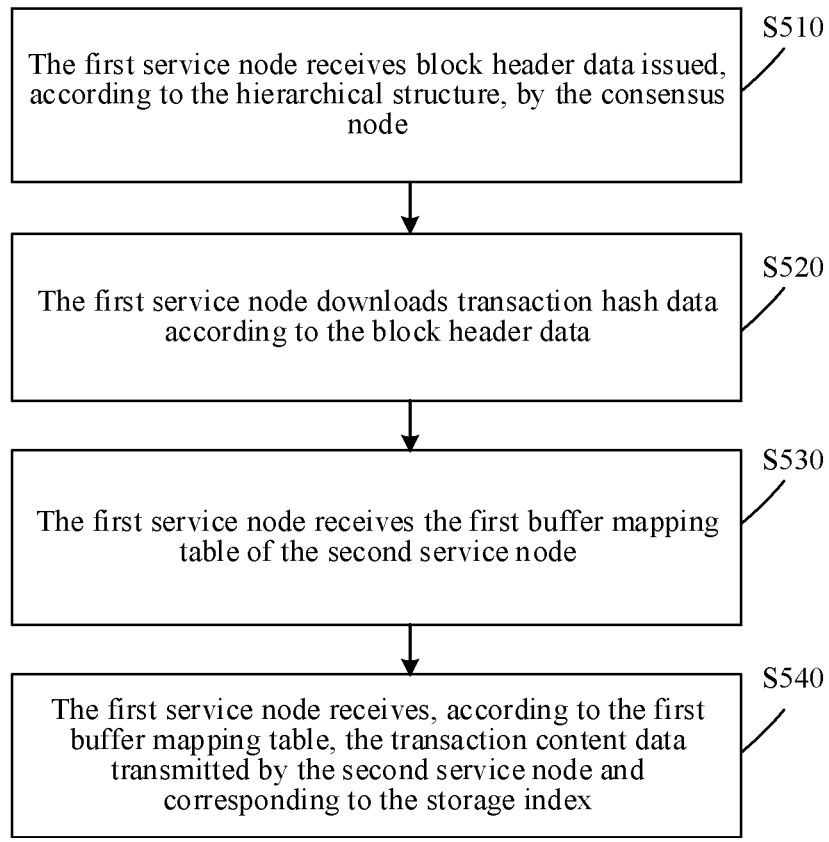
FIG. 5 schematically shows a flowchart of a data synchronization method performed by a blockchain according to one embodiment of the present disclosure.

FIG. 5 schematically shows a flowchart of a data synchronization method performed by a blockchain according to one embodiment of the present disclosure. The method provided in this embodiment of the present disclosure can be processed by any electronic device with computing processing ability. The method provided in this embodiment of the present disclosure can be applied to a blockchain. The blockchain may include a hierarchical structure composed of a consensus node, a first service node and a second service node, the consensus node being a root node in the hierarchical structure, and the first service node and the second service node being descendant nodes of the consensus node.

As shown in FIG. 5, the data synchronization method based on the blockchain provided in this embodiment of the present disclosure is implemented by the first service node, and may include the following steps.

In S510, the first service node receives block header data issued, according to the hierarchical structure, by the consensus node.

In this embodiment of the present disclosure, the first service node may receive block header data issued by a father node of the first service node. wherein the block header data is issued by the consensus node to the father node of the first service node according to the hierarchical structure. FIG. 6 is taken as an example. The first service node is service node E shown in FIG. 6, which is exemplified. The block header data issued by the consensus node according to the hierarchical structure may be issued by one or more of consensus nodes F. A, and G to the child nodes in the second layer, and the block header data is then issued to the child nodes of the third layer through the service nodes in the second layer. For example, consensus node F of the first layer issues the block header data to the child nodes of node F in the next layer: service nodes B, C. After receiving the block header data, service node B issues the block header data to the child node of node B in the third layer: service node E. The first service node receives the block header data issued, according to the hierarchical structure, by the consensus node, so that the block header data can be quickly synchronized.

In S520, the first service node downloads transaction hash data according to the block header data.

In this embodiment of the present disclosure, the transaction hash data is an identifier of transaction data, which may be, for example, a transaction number of transaction content data. The transaction hash data may be included in block body data. The block body data may also include the transaction content data. After receiving the block header data, the first service node will be triggered to download the transaction hash data, so as to quickly synchronize the transaction hash data.

In S530, the first service node receives a first buffer mapping table of the second service node, the first buffer mapping table including a correspondence relationship between the transaction hash data and a local storage index of transaction content data at the second service node.

In this embodiment of the present disclosure, the storage index is, for example, an address and a storage position serial number of local storage of the transaction content data at a corresponding service node (the second service node in this embodiment). The second service node may locally acquire the specific transaction content data according to the storage index. The transaction hash data is a transaction number of the corresponding transaction content data. Each second service node may broadcast its own buffer mapping table in the network. The second service node may be a service node connected to the first service node. The second service node may be a network node at the same layer of the first service node in the hierarchical structure of the blockchain, or may be a father node of the first service node.

In S540, the first service node receives, according to the first buffer mapping table, the transaction content data transmitted by the second service node and corresponding to the storage index.

In this embodiment of the present disclosure, the first service node may determine, according to the first buffer mapping table, the storage index, in the second service node, of the transaction content data required to be downloaded by the first service node. The transaction content data required to be downloaded by the first service node refers to transaction content data required to be locally stored by the first service node. After determining, according to the transaction hash data, the transaction content data required to be downloaded by the first service node, the first service node transmit a data request for the transaction content data to the second service node. The data request includes the storage index corresponding to the transaction content data, so that the second service node can locally acquire the specific transaction content data according to the storage index, and returns the transaction content data required to be downloaded by the first service node to the first service node, so as to synchronize the transaction content data.

According to the data synchronization method performed by a blockchain provided by this implementation of the present disclosure, the block header data is issued to the first service node according to the hierarchical structure formed by the consensus node, the first service node and the second service node, so that certain connectivity between the consensus node and the service nodes (the first service node and the second service node) can be ensured, and excessive connection between the service nodes and the consensus node can be prevented. A consensus node serving as a root node issues block header data to a descendant node serving as a consensus node, so that the block header data can be quickly issued. Downloading the transaction hash data is triggered according to the block header data, and the second service node transmits the transaction content data to the first service node, so that the performance of a peer to peer network can be fully used, and the network consumption of consensus nodes by service nodes can be reduced, ensuring that a non-core data request of the blockchain will not affect normal consensus block production.

In an exemplary embodiment, in S510, when the first service node receives the block header data issued, according to the hierarchical structure, by the consensus node, the first service node may verify the block header data according to first block hash information of the block header data and second block hash information of target block header data, the target block header data being previous block header data of the block header data locally stored in the first service node. In this embodiment, the first service node may ensure the correctness of the received block header data by verifying the received block header data. Therefore, the first service node may more accurately execute S520 after the verification succeeds.

In an exemplary embodiment, as shown in FIG. 6, when the number of father nodes (node B) of the first service node (such as node E in FIG. 6) is less than a threshold of the number of father nodes, or when connection between the first service node and the father nodes of the first service node fails, a service node of a superior layer of the first service node in the hierarchical structure is added as a father node of the first service node; and When the adding of a service node of a superior layer as a father node of the first service node fails, a service node of a same layer of the first service node in the hierarchical structure is added as the father node of the first service node.

The threshold of the number of father nodes is used for limiting the minimum number of father nodes connected to each service node, and specific numerical values thereof may include, but are not limited to, 2, 3, and 4. For example, as shown in FIG. 6, the threshold for the number of father nodes of a service node is 2. Father nodes of service node E includes service nodes B and C. Father node of service node H includes service nodes C and D. Father nodes of service node B include consensus nodes F and A. Preferably, since it is guaranteed that each service node has 2 or more father nodes, the number of service nodes of each layer may be required to be twice or more times the number of nodes of the superior layer (not shown in FIG. 6). The fact that the connection between the first service node and the father node of the first service node fails may include a case that the father node of the first service node fails. When the service node (for example, service node D in FIG. 6) of the superior layer is added as the father node of the first service node, the first service node (for example, service node E in FIG. 6) may acquire, according to contents broadcast by other service nodes, service nodes included in each layer, so as to determine the service node of the superior layer of the first service node and make a request for connection to the service node of the superior layer, Therefore, the service node of the superior layer can be used as the father node of the first service node.

In this embodiment, by means of limiting the number of father nodes of each service node to be the threshold of the number of father nodes, certain connectivity between the first service node and the second service node can be guaranteed, and a phenomenon that data cannot be transmitted due to a failure in a service node is avoided.

Figure 7:
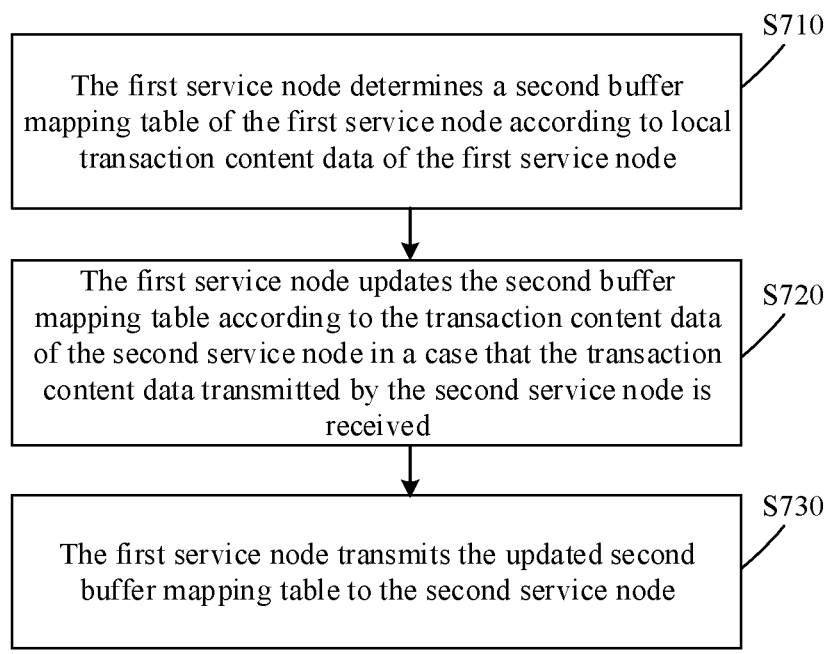
FIG. 7 schematically shows a flow diagram of a data synchronization method performed by a blockchain according to one embodiment of the present disclosure.

FIG. 7 schematically shows a flowchart of a data synchronization method performed by a blockchain according to one embodiment of the present disclosure.

As shown in FIG. 7, the data synchronization method based on the blockchain according to this embodiment shown in FIG. 5 may further include the following steps.

In S710, the first service node determines a second buffer mapping table of the first service node according to local transaction content data of the first service node.

In this embodiment of the present disclosure, an identifier of the transaction content data locally stored in the first service node may be stored to a buffer mapping table of the first service node. Therefore, the transaction content data locally stored in the first service node may be acquired according to the second buffer mapping table of the first service node.

In S720, the first service node updates the second buffer mapping table according to the transaction content data of the second service node when the transaction content data transmitted by the second service node is received.

In this embodiment of the present disclosure, the first service node may locally store the transaction content data transmitted by the second service node when the transaction content data transmitted by the second service node is received. Therefore, the transaction content data locally stored in the first service node is updated. The buffer mapping table of the first service node is updated according to the new transaction content data transmitted by the second service node, so that the consistency between the buffer mapping table of the first service node and the transaction content data locally stored in the first service node can be ensured, and the first service node can be avoided from repeatedly requesting for acquiring repeated transaction content data from the second service node; and at the same time, it can be convenient for other service nodes to request for updated transaction content data from the first service node according to the updated buffer mapping table of the first service node.

In S730, the first service node transmits the updated second buffer mapping table to the second service node.

The first service node may broadcast the second buffer mapping table of the first service node to service nodes including the second service node, so that the second service node receives, according to the second buffer mapping table, a transaction content request transmitted by the first service node. Each service node updates and maintains its own buffer mapping table in real time according to changes in the local transaction content data, so that transmission of the transaction content data can be achieved between the service nodes. Therefore, the network consumption of consensus nodes by service nodes is reduced, and the impact of a non-core data request of the blockchain on normal consensus block production is lowered.

Figure 8:
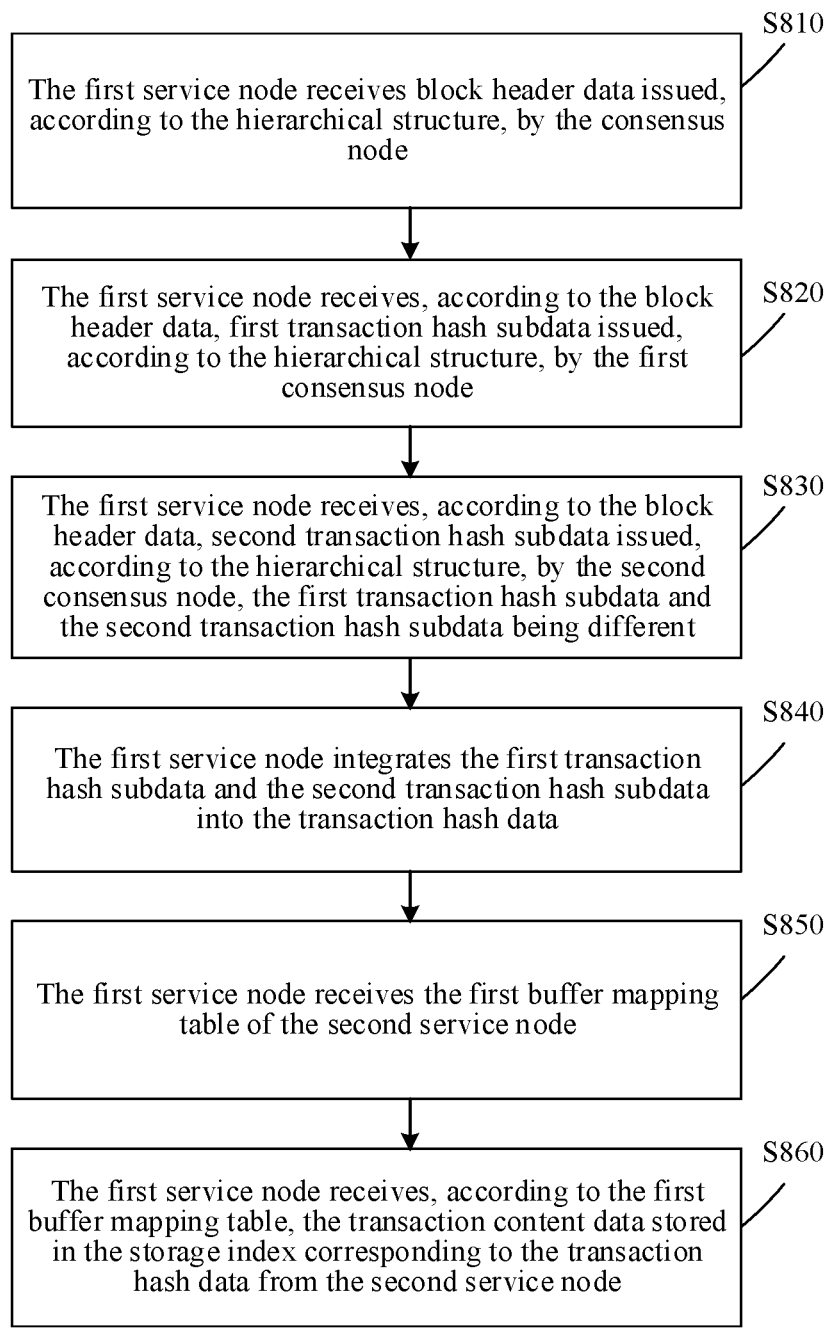
FIG. 8 schematically shows a flowchart of a data synchronization method performed by a blockchain according to another embodiment of the present disclosure.

FIG. 8 schematically shows a flowchart of a data synchronization method performed by a blockchain according to one embodiment of the present disclosure.

As shown in FIG. 8, in this embodiment, the consensus node may include a first consensus node and a second consensus node. The data synchronization method based on the blockchain in this embodiment of the present disclosure may further include the following steps.

In S810, the first service node receives block header data issued, according to the hierarchical structure, by the consensus node.

S810 of this embodiment of the present disclosure may be similar to S510, and descriptions thereof will be omitted here.

In S820, the first service node receives, according to the block header data, first transaction hash subdata issued, according to the hierarchical structure, by the first consensus node.

In this embodiment of the present disclosure, it is assumed that the first service node is service node B shown in FIG. 6, that the first consensus node is consensus node F shown in FIG. 6, and that the second consensus node is consensus node A shown in FIG. 6. When the block header data obtained by service node B includes blocks with block heights 1-10000, consensus node F may preferentially cache the first transaction hash subdata, and the first transaction hash subdata may include transaction hash data in block bodies with block heights in a range of [1, n]; and n is an integer greater than or equal to 0 and less than or equal to 10000. Consensus node A may preferentially cache second transaction hash subdata with block heights in a range of [n, 10000], and the second transaction hash subdata may include transaction hash data in block bodies with block heights in a range of [n, 10000]. It is understood that in this embodiment, a consensus node may also continue to cache other transaction hash data after preferentially caching transaction hash data with some block heights, and finally obtain transaction hash data in all blocks in the current blockchain.

In S830, the first service node receives, according to the block header data, second transaction hash subdata issued, according to the hierarchical structure, by the second consensus node, the first transaction hash subdata and the second transaction hash subdata being different.

In this embodiment of the present disclosure, following the example in S820, assuming n=5000, service node B may acquire the transaction hash data in block bodies with block heights from 1 to 5000 from consensus node F, and acquire the transaction hash data in block bodies with block heights from 5000 to 10000 from consensus node A. The transaction hash data in the block bodies with block height from 1 to 5000 is the first transaction hash subdata. The transaction hash data in the block bodies with block height from 5000 to 10000 is the second transaction hash subdata.

In S840, the first service node integrates the first transaction hash subdata and the second transaction hash subdata into the transaction hash data.

In this embodiment of the present disclosure, the first service node may also issue the transaction hash data to a service node of a next layer according to the hierarchical structure after receiving the transaction hash data. Specifically, the first service node may generate a buffer mapping table according to local transaction hash data and broadcast the buffer mapping table. The buffer mapping table may further include a storage index of transaction content data corresponding to the transaction hash data, which has been described above and will not be repeated here. The service node of the next layer may communicate with the first service node according to the buffer mapping table broadcast by the first service node, and receive the transaction hash data issued by the first service node. The service node of the next layer may download, according to the buffer mapping table broadcast by the first service node, all transaction hash data of a complete block stored in the first service node, and update the buffer mapping table of the local transaction hash data, so that the correctness of the buffer mapping table of the transaction hash data can be ensured.

In S850, the first service node receives the first buffer mapping table of the second service node.

This step may be similar to S530, which will not be repeated here. In addition, the first buffer mapping table of the second service node in this step includes a mapping relationship between the transaction hash data stored locally in the second service node and the transaction content data (for example, represented as the storage index of the transaction content data). The transaction hash data in the second service node may be fully stored, and the transaction content data may be stored on demand. In this case, the buffer mapping table of the second service node may include full transaction hash data in the blockchain, and the storage index of the transaction content data mapped to each transaction hash data and locally stored in the second service node. The transaction hash data corresponding to the transaction content data not stored in the second service node is marked.

In S860, the first service node receives, according to the first buffer mapping table, the transaction content data stored in the storage index corresponding to the transaction hash data from the second service node.

This step may be similar to S540, which will not be repeated here.

Through the above implementation, different consensus nodes can preferentially cache transaction hash data with different block heights, so that the first service node (namely service node B in the above example) can concurrently download the transaction hash data with different block heights from different consensus nodes, improving the synchronization efficiency of transaction hash data.

Figure 9:
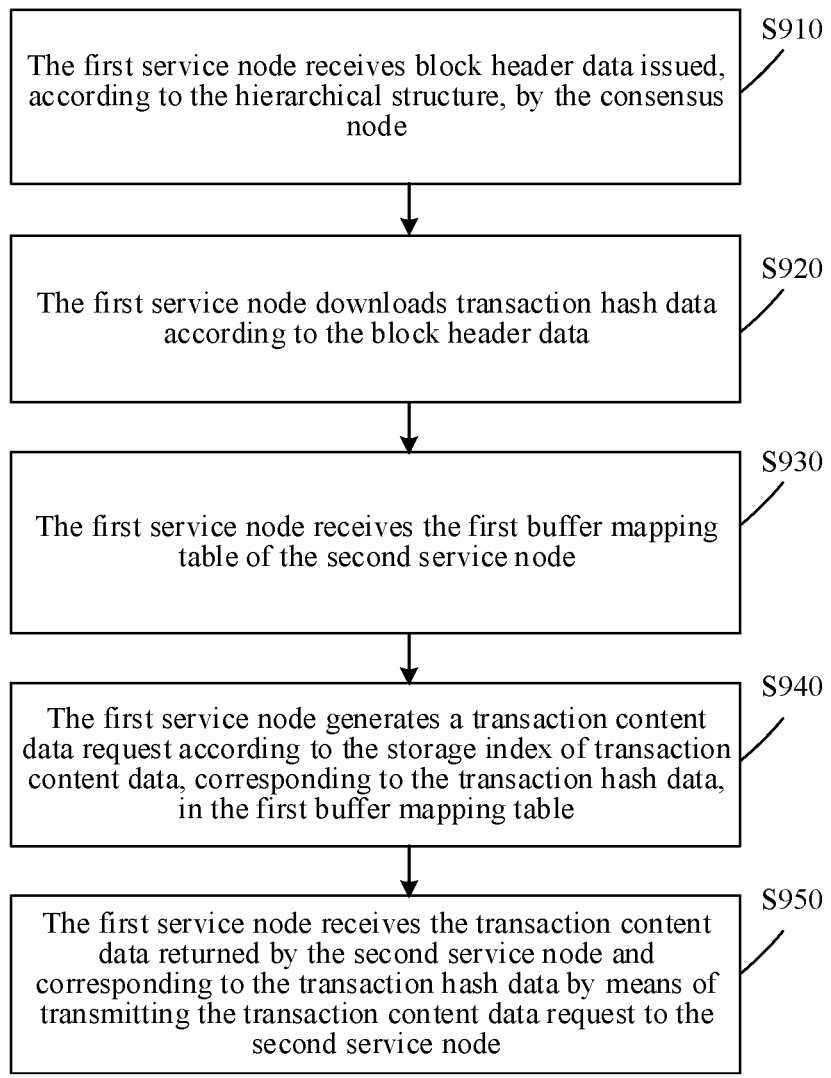
FIG. 9 schematically shows a flowchart of a data synchronization method performed by a blockchain according to yet another embodiment of the present disclosure.

FIG. 9 schematically shows a flowchart of a data synchronization method performed by a blockchain according to one embodiment of the present disclosure.

As shown in FIG. 9, in this embodiment of the present disclosure, the first service node and the second service node are service nodes of the same layer. The data synchronization method based on the blockchain in this embodiment of the present disclosure may further include the following steps.

In S910, the first service node receives block header data issued, according to the hierarchical structure, by the consensus node.

S910 of this embodiment of the present disclosure may be similar to S510, and descriptions thereof will be omitted here.

In S920, the first service node downloads transaction hash data according to the block header data.

S920 of this embodiment of the present disclosure may be similar to S520, and descriptions thereof will be omitted here.

In S930, the first service node receives the first buffer mapping table of the second service node.

S930 of this embodiment of the present disclosure may be similar to S530, and descriptions thereof will be omitted here.

In S940, the first service node generates a transaction content data request according to the storage index of transaction content data, corresponding to the transaction hash data, in the first buffer mapping table.

In this embodiment of the present disclosure, the second service node may generate a buffer mapping table of the second service node according to the locally stored transaction content data, and broadcast the buffer mapping table of the second service node to other nodes in the hierarchical structure. After receiving the buffer mapping table of the second service node, the first service node may also receive buffer mapping tables of other nodes broadcast to the first service node by other nodes in the hierarchical structure. The hierarchical structure in FIG. 6 is taken as an example. When service node E serving as the first service node receives the buffer mapping table of service node H transmitted by service node H serving as the second service node, service node E may also receive the buffer mapping table of service node B transmitted by service node B serving as the father node of the superior layer. Assuming that both the buffer mapping table of service node H and the buffer mapping table of service node B have transaction content data S required by service node E, service node E may preferentially transmit the transaction content data request to the service nodes of the same layer. That is, service node E preferentially generates the transaction content data request according to the buffer mapping table of service node H of the same layer of service node E. The transaction content data request may be a request for downloading transaction content data S.

In S950, the first service node receives, by means of transmitting the transaction content data request to the second service node, the transaction content data returned by the second service node and corresponding to the transaction hash data.

In this embodiment of the present disclosure, following the example of S950, after the first service node transmits the transaction content data request to the second service node of the same layer of the first service node, the second service node may transmit, to the first service node, all transaction content data of a block where transaction content data S is located. The first service node may store transaction content data S after receiving all the transaction content data of the block where transaction content data S is located. Other transaction content data that is not required by the first service node may not be processed. The first service node may also update the local buffer mapping table according to received transaction content data S. In this embodiment, the first service node can ensure the correctness of the buffer mapping table by means of caching all the transaction content data in the complete block in the second service node and updating the buffer mapping table of the first service node.

In an exemplary embodiment, the first service node may generate a first candidate transaction content data request according to a buffer mapping table of the father node of the first service node when the first service node fails in generating the transaction content data request. The first service node transmits the first candidate transaction content data request to the father node of the first service node, and receives transaction content data returned by the father node of the first service node and corresponding to the transaction hash data.

When there is no transaction content data S required by the first service node in the first buffer mapping table of the second service node, the first service node will fail in generating, according to the buffer mapping table of the second service node, the transaction content data request. In this embodiment, since the second service node does not locally store transaction content data S required by the first service node, the first service node may generate the first candidate transaction content data request according to the buffer mapping table of the father node of the superior layer of the first service node in the hierarchical structure. In this embodiment, the first service node preferentially transmits the transaction content data request to the service nodes of the same layer. When the first service node fails in generating, according to the buffer mapping tables of the service nodes of the same layer, the transaction content data request, the first service node generates, according to the buffer mapping table of the father node of the superior layer, the first candidate transaction content data request serving as the transaction content data request, so that the first service node can be prevented from repeatedly requesting the same transaction content data from the superior layer, and greater data transmission between different layers in the hierarchical structure is reduced.

In an exemplary embodiment, the father node of the first service node is a child node of the consensus node. When the first service node fails in generating the first candidate transaction content data request, the first service node generates a second candidate transaction content data request according to a buffer mapping table of the consensus node. The first service node transmits the second candidate transaction content data request to the consensus node, and receives the transaction content data returned by the consensus node and corresponding to the transaction hash data.

The hierarchical structure shown in FIG. 6 is taken as an example. Assuming that the first service node is node E, the father node of the first service node is node B. Since the child node of the consensus node is father node B of the first service node, the consensus node in this example may be node F or A shown in FIG. 6. The consensus node is described by taking node F as an example. When first service node E fails in generating the transaction content data request according to father node B of node E, since the superior layer of node B has become a root node of the hierarchical structure, namely a consensus node, the second candidate transaction content data request serving as the transaction content data request may be generated according to the buffer mapping table of consensus node F, and consensus node F returns the transaction data content to first service node E in response to the second candidate transaction content data request. In this embodiment, when the first service node fails in generating the transaction content data request according to both the service node of the same layer and the father node of the superior layer, the first service node makes a transaction content data request to the consensus node. The method of "acquiring data in a P2P manner first, but if the first way fails, acquiring data from the superior layer" can avoid excessive network consumption of consensus nodes by the first service node, and ensure that non-core data requests of the blockchain will not affect normal consensus block production.

In another embodiment of the present disclosure, FIG. 6 is illustrated. In the hierarchical structure shown in FIG. 6, a connection manner shown in FIG. 6 above is formed from consensus nodes to the outside. Consensus nodes of a core consensus network layer are kept as first layer root nodes, and the consensus nodes are fully connected to each other. Service nodes B, C, D, E, and H are arranged hierarchically in sequence according to node sizes and management as well as arrangement, forming the hierarchical structure. It can be required to ensure that each node has 2 or more father nodes. Therefore, it can be required that the number of nodes of each layer is twice or more times the number of nodes of the superior layer.

In this hierarchical structure, if a certain service node fails in accessing a father node of the superior layer of the service node, the service node is connected to a father node of a service node of the same layer, so as to keep 3 or more father nodes being connected. If such father nodes cannot be found, the service node is connected to the service nodes of the same layer.

The data synchronization method in this embodiment can be used for synchronizing block data. The synchronization of the block data may be divided into block body data and block header data. The block header data may be sequentially issued. The superior layer in the hierarchical structure may actively push the new block header data to nodes of a lower layer after acquiring new block header data. When the node of the lower layer finds that its old block header is insufficient, the node may directly initiate a connection (such as a streaming connection) to the father node. After the connection is completed, the node of the lower layer may download and verify the block header data in sequence.

After acquiring the block header data, one service node may download the block body data according to the block header data. The block body data is divided into transaction hash data and transaction content data. Each service node maintains its own buffer mapping table (for example, in the form of buffermap) between the transaction hash data and the transaction content data, and interacts with child nodes of the service node.

In order to ensure the correctness of the buffer mapping table, when the service node downloads the block body data, the service node may be set to at least download all the transaction hash data or all the transaction content data of one complete block at a time, and then update its own buffer mapping table.

For the transaction hash data, all the nodes (including the consensus nodes and the service nodes) are required to eventually synchronize all the data. Each consensus node will preferentially cache the transaction hash data with different heights, and may be allowed to download the data in parallel. Therefore, the service node may concurrently download the transaction hash data from the nodes of the superior layer according to contents of the acquired buffer mapping table. For example, all contents of the nodes of the superior layer may be downloaded according to the contents of the buffer mapping table. All the contents are finally completely downloaded not in order.

Each service node may download the transaction content data on demand. For example, the foregoing method of "acquiring data in a P2P manner first, but if the first way fails, acquiring data from the superior layer" can be used.

Assuming that one service node inquires the data required by the service node after acquiring the buffer mapping tables of all its father nodes, the service node may randomly transmit a downloading request (a transaction content data request) to one father node to obtain a father node of the father node, so as to access the obtained father node until a node, including the data required by the service node, in the buffer mapping table.

The hierarchical structure provided according to the embodiments of the present disclosure ensures certain connectivity, and can also prevent excessive connection and network storm. During data synchronization, data are distinguished according to three types: block header data, transaction hash data and transaction content data, and different download policies are matched in a peer to peer network, so that the performance of the peer to peer network can be fully used, and the network consumption of consensus nodes by service nodes can be reduced, ensuring that a non-core data request of the blockchain will not affect normal consensus block production.

System embodiments of the present disclosure are introduced below; and can be used for implementing the above data synchronization method performed by a blockchain of the present disclosure. For details not disclosed in the system embodiments of the present disclosure, reference is made to the foregoing embodiments of the data synchronization method performed by a blockchain of the present disclosure.

Figure 10:
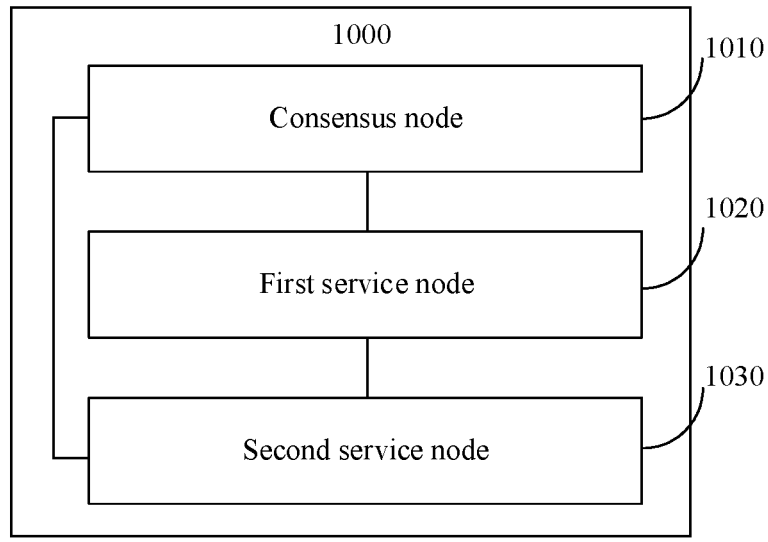
FIG. 10 schematically shows a block diagram of a data synchronization system based on a blockchain according to one embodiment of the present disclosure.

FIG. 10 schematically shows a block diagram of a data synchronization system based on a blockchain according to one embodiment of the present disclosure.

Referring to FIG. 10, a data synchronization system 1000 based on a blockchain according to one embodiment of the present disclosure may include a hierarchical structure composed of a consensus node 1010, a first service node 1020 and a second service node 1030. The consensus node 1010 is a root node in the hierarchical structure, and the first service node 1020 and the second service node 1030 are descendant nodes of the consensus node 1010.

The consensus node 1010 is configured to issue block header data according to the hierarchical structure.

The consensus node 1010 is further configured to issue transaction hash data and transaction content data according to the hierarchical structure.

The second service node 1030 is configured to transmit a buffer mapping table of the second service node to the first service node, the buffer mapping table including a correspondence relationship between the transaction hash data and a local storage index of transaction content data at the second service node.

The first service node 1020 is configured to receive the block header data issued, according to the hierarchical structure, by the consensus node 1010; download transaction hash data according to the block header data; receive the buffer mapping table of the second service node 1030; receive, according to the buffer mapping table of the second service node 1030, the transaction content data stored in the storage index corresponding to the transaction hash data from the second service node 1030.

According to the data synchronization system based on a blockchain provided by this implementation of the present disclosure, the block header data is issued to the first service node according to the hierarchical structure formed by the consensus node, the first service node and the second service node, so that certain connectivity between the consensus node and the service nodes (the first service node and the second service node) can be ensured, and excessive connection between the service nodes and the consensus node can be prevented. A consensus node serving as a root node issues block header data to a descendant node serving as a consensus node, so that the block header data can be quickly issued. Downloading the transaction hash data is triggered according to the block header data, and the second service node transmits the transaction content data to the first service node, so that the performance of a peer to peer network can be fully used, and the network consumption of consensus nodes by service nodes can be reduced, ensuring that a non-core data request of the blockchain will not affect normal consensus block production.

In an exemplary embodiment, the first service node 1020 may be further configured to: determine a buffer mapping table of the first service node according to local transaction content data of the first service node; update the second buffer mapping table of the first service node 1020 according to the transaction content data of the second service node 1030 when the transaction content data transmitted by the second service node 1030 is received; and transmit the updated second buffer mapping table to the second service node 1030.

In an exemplary embodiment, the first service node 1020 may be further configured to: add a service node of a superior layer of the first service node in the hierarchical structure as a father node of the first service node 1020 when the number of father nodes of the first service node 1020 is less than a threshold of the number of father nodes, or that connection between the first service node 1020 and the father node of the first service node 1020 fails; and add a service node of a same layer of the first service node in the hierarchical structure as the father node of the first service node 1020 when the adding a service node of a superior layer as a father node of the first service node 1020 fails.

In an exemplary embodiment, the first service node 1020 may be further configured to: verify the block header data according to first block hash information of the block header data and second block hash information of target block header data, the target block header data being locally stored previous block header data of the block header data; and execute, after the verification succeeds, the operation of downloading transaction hash data according to the block header data.

In an exemplary embodiment, the first service node 1020 may be configured to: receive the block header data issued, through the father node of the first service node 1020, by the consensus node; wherein the block header data is issued by the consensus node 1010 to the father node of the first service node 1020 according to the hierarchical structure.

In an exemplary embodiment, the consensus node includes a first consensus node and a second consensus node. When the first service node 1020 downloads the transaction hash data according to the block header data, the first service node 1020 may be configured to: receive, according to the block header data, first transaction hash subdata issued, according to the hierarchical structure, by the first consensus node; receive, according to the block header data, second transaction hash subdata issued, according to the hierarchical structure, by the second consensus node, the first transaction hash subdata and the second transaction hash subdata being different; and integrate the first transaction hash subdata and the second transaction hash subdata into the transaction hash data.

In an exemplary embodiment, the first service node and the second service node are service nodes located on a same layer in the hierarchical structure. The first service node 1020 may be configured to: generate a transaction content data request according to the storage index of transaction content data, corresponding to the transaction hash data, in the first buffer mapping table; and receive, by means of transmitting the transaction content data request to the second service node 1030, the transaction content data returned by the second service node 1030 and corresponding to the transaction hash data.

In an exemplary embodiment, the first service node 1020 may be further configured to: generate a first candidate transaction content data request according to a buffer mapping table of the father node of the first service node 1020 when the first service node fails in generating the transaction content data request; and receive, by means of transmitting the first candidate transaction content data request to the father node of the first service node 1020, the transaction content data returned by the father node of the first service node 1020 and corresponding to the transaction hash data.

In an exemplary embodiment, the father node of the first service node 1020 is a child node of the consensus node. The first service node 1020 may be further configured to: generate a second candidate transaction content data request according to a buffer mapping table of the consensus node 1010 when the first service node fails in generating the first candidate transaction content data request; and receive, by means of transmitting the second candidate transaction content data request to the consensus node 1010, the transaction content data returned by the consensus node 1010 and corresponding to the transaction hash data.

Figure 11:
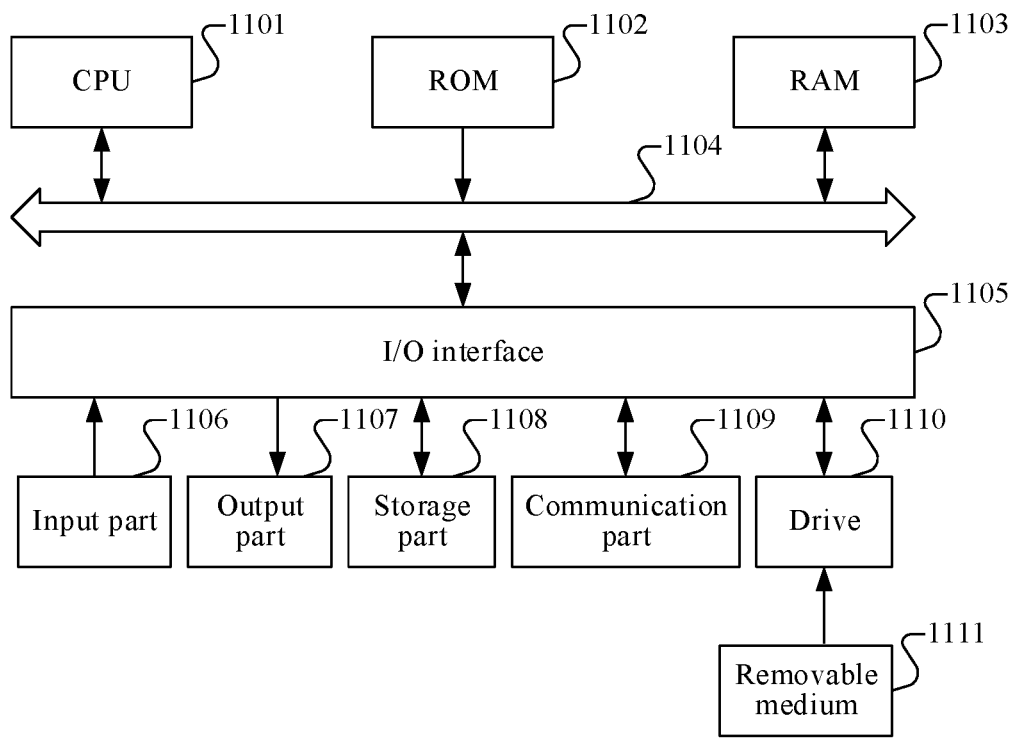
FIG. 11 is a schematic structural diagram of an electronic device adapted to implement the embodiments of the present disclosure.

FIG. 11 is a schematic structural diagram of an electronic device adapted to implement the embodiments of the present disclosure. The electronic device 1100 shown in FIG. 11 is merely an example, and does not constitute any limitation on functions and use ranges of the embodiments of the present disclosure.

As shown in FIG. 11, the electronic device 1100 includes a central processing unit (CPU) 1101, which can execute various appropriate actions and processing according to a program stored in a read-only memory (ROM) 1102 or a program loaded from a storage part 1108 to a random access memory (RAM) 1103. The RAM 1103 further stores various programs and data required for operating the system. The CPU 1101, the ROM 1102, and the RAM 1103 are connected to each other through a bus 1104. An input/output (I/O) interface 1105 is also connected to the bus 1104.

The following components are connected to the I/O interface 1105: an input part 1106 including a keyboard and a mouse, etc.; an output part 1107 including a cathode ray tube (CRT), a liquid crystal display (LCD), a speaker, or the like; a storage part 1108 including hard disk, or the like; and a communication part 1109 including a network interface card such as a LAN card, a modem, or the like. The communication part 1109 performs communication processing by using a network such as the Internet. A drive 1110 is also connected to the I/O interface 1105 as required. A removable medium 1111, such as a magnetic disk, an optical disc, a magneto-optical disk, or a semiconductor memory, is installed on the drive 1110 as required, so that a computer program read from the removable medium is installed into the storage part 1108 as required.

Particularly, according to an embodiment of the present disclosure, the processes described below by referring to the flowcharts may be implemented as computer software programs. For example, an embodiment of the present disclosure includes a computer program product. The computer program product includes a computer program stored in a non-transitory computer-readable medium. The computer program includes a program code used for performing a method shown in the flowchart. In such an embodiment, the computer program may be downloaded and installed through the communication part 1109 from a network, and/or installed from the removable medium 1111. When the computer program is executed by the CPU 1101, the various functions defined in the system of the present disclosure are executed.

The non-transitory computer-readable medium shown in the present disclosure may be a computer-readable signal medium or a computer-readable storage medium or any combination of two. The computer-readable storage medium may be, for example, but is not limited to, an electrical, magnetic, optical, electromagnetic, infrared, or semiconductor system, apparatus, or device, or any combination thereof. A more specific example of the computer-readable storage medium may include but is not limited to: An electrical connection having at least one wire, a portable computer magnetic disk, a hard disk, a random access memory (RAM), a read-only memory (ROM), an erasable programmable read-only memory (EPROM or a flash memory), an optical fiber, a compact disk read-only memory (CD-ROM), an optical storage device, a magnetic storage device, or any appropriate combination thereof. In the present disclosure, the computer-readable storage medium may be any tangible medium containing or storing a program, and the program may be used by or used in combination with an instruction execution system, an apparatus, or a device. In the present disclosure, a computer-readable signal medium may include a data signal in a baseband or propagated as a part of a carrier wave, the data signal carrying a computer-readable program code. A data signal propagated in such a way may assume a plurality of forms, including, but not limited to, an electromagnetic signal, an optical signal, or any appropriate combination thereof. The computer-readable signal medium may be further any non-transitory computer-readable medium in addition to a computer-readable storage medium. The non-transitory computer-readable medium may send, propagate, or transmit a program that is used by or used in combination with an instruction execution system, apparatus, or device. The program code included in the non-transitory computer-readable medium may be transmitted using any suitable medium, including but not limited to: a wireless medium, a wire, an optical cable, an RF, or the like, or any suitable combination thereof.

The flowcharts and block diagrams in the accompanying drawings illustrate possible system architectures, functions, and operations that may be implemented by a system, a method, and a computer program product according to various embodiments of the present disclosure. Each box in a flowchart or a block diagram may represent a module, a program segment, or a part of code. The foregoing module, the program segment, or the part of code includes at least one executable instruction used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

In another aspect, the present disclosure further provides a computer readable medium. The computer readable medium may be included in the electronic device described in the above embodiments, or may exist alone without being assembled into the electronic device. The non-transitory computer-readable medium carries one or more programs, the one or more programs, when executed by the electronic device, causing the electronic device to implement the method described in the following embodiments. For example, the electronic device can implement the various steps shown in FIG. 5 or FIG. 7 or FIG. 8 or FIG. 9.

The present disclosure further provides a computer program product including instructions. When the computer program product runs on a computer, the computer is caused to perform the methods provided in the foregoing embodiments.

Through the descriptions of the foregoing implementations, a person skilled in the art easily understands that the exemplary implementations described herein may be implemented through software, or may be implemented through software located in combination with necessary hardware. Therefore, the technical solutions of the embodiments of the present disclosure may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of the present disclosure.

After considering the specification and practicing the disclosed invention, a person skilled in the art may easily conceive of other implementations of the present disclosure. The present disclosure is intended to cover any variation, use, or adaptive change of the present disclosure. These variations, uses, or adaptive changes follow the general principles of the present disclosure and comprise common general knowledge or common technical means in the art that are not disclosed in the present disclosure. The specification and embodiments are merely regarded as exemplary, and the true scope and spirit of the present disclosure is indicated by the following claims. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

It is to be understood that the present disclosure is not limited to the precise structures described above and shown in the accompanying drawings, and various modifications and changes can be made without departing from the scope of the present disclosure. The scope of the present disclosure is limited by the appended claims only.

What is claimed is:

1. A data synchronization method performed by a blockchain system, the blockchain system comprising:
    a hierarchical structure comprising (i) a core consensus network layer including a consensus node, (ii) a routing proxy layer including one or more routing proxy nodes, and (iii) a service layer including a first service node and a second service node,
    the consensus node being a root node of the core consensus network layer in the hierarchical structure that acts as a consensus network of the blockchain system,
    the first service node and the second service node being descendant nodes of the consensus node in the service layer of the hierarchical structure that acts as a witness network of the blockchain system, and
    the first service node and the second service node in the witness network are connected to the consensus node in the consensus network via the one or more routing proxy nodes in the routing proxy layer located between the service layer and the core consensus network layer,
    the method comprising:
    receiving, by the first service node and via the one or more routing proxy nodes, block header data newly issued, according to the hierarchical structure, by the consensus node;
    downloading, by the first service node and via the one or more routing proxy nodes, transaction hash data according to the block header data from the consensus node;
    receiving, by the first service node and from the second service node, a first buffer mapping table of the second service node, the first buffer mapping table comprising a correspondence relationship between the transaction hash data and a local storage index of transaction content data at the second service node;

receiving, by the first service node according to the first buffer mapping table, the transaction content data stored in the storage index corresponding to the transaction hash data from the second service node; and synchronizing, by the first service node, the transaction hash data with the transaction content data.

2. The method according to claim 1, the method further comprising:

determining, by the first service node, a second buffer mapping table of the first service node according to local transaction content data of the first service node;

updating, by the first service node, the second buffer mapping table according to the transaction content data of the second service node when the transaction content data transmitted by the second service node is received; and transmitting, by the first service node, the updated second buffer mapping table to the second service node.

3. The method according to claim 1, the method further comprising:

adding a third service node in a superior layer of the hierarchical structure as a father node of the first service node when the number of father nodes of the first service node is less than a threshold of the number of father nodes, or that connection between the first service node and the father nodes of the first service node fails; and adding a fourth service node in the superior layer of the hierarchical structure as the father node of the first service node when the adding the third service node in the superior layer as the father node of the first service node fails.

4. The method according to claim 1, the method further comprising:

verifying, by the first service node, the block header data according to first block hash information of the block header data and second block hash information of target block header data, the target block header data being locally stored previous block header data of the block header data; and executing, by the first service node after the verification succeeds, the operation of downloading transaction hash data according to the block header data.

5. The method according to claim 1, wherein the receiving, by the first service node and via the one or more routing proxy nodes, the block header data newly issued, according to the hierarchical structure, by the consensus node comprises:

receiving, by the first service node and via the one or more routing proxy nodes, the block header data newly issued, through a father node of the first service node, by the consensus node;

wherein the block header data is issued by the consensus node to the father node of the first service node according to the hierarchical structure.

6. The method according to claim 1, wherein the consensus node comprises a first consensus node and a second consensus node; wherein the downloading, by the first service node, transaction hash data according to the block header data comprises:

receiving, by the first service node according to the block header data, first transaction hash subdata issued, according to the hierarchical structure, by the first consensus node;

receiving, by the first service node according to the block header data, second transaction hash subdata issued, according to the hierarchical structure, by the second consensus node, the first transaction hash subdata and the second transaction hash subdata being different; and integrating, by the first service node, the first transaction hash subdata and the second transaction hash subdata into the transaction hash data.

7. The method according to claim 1, wherein the first service node and the second service node are service nodes located on a same layer in the hierarchical structure; wherein the receiving, by the first service node according to the first buffer mapping table, the transaction content data stored in the storage index corresponding to the transaction hash data from the second service node comprises:

generating, by the first service node, a transaction content data request according to the storage index of transaction content data, corresponding to the transaction hash data, in the first buffer mapping table; and receiving, by the first service node by means of transmitting the transaction content data request to the second service node, the transaction content data returned by the second service node and corresponding to the transaction hash data.

8. An electronic device acting as a first service node of a blockchain system, the blockchain system comprising:

a hierarchical structure comprising (i) a core consensus network layer including a consensus node, (ii) a routing proxy layer including one or more routing proxy nodes, and (iii) a service layer including a first service node and a second service node, the consensus node being a root node of the core consensus network layer in the hierarchical structure that acts as a consensus network of the blockchain system, the first service node and the second service node being descendant nodes of the consensus node in the service layer of the hierarchical structure that acts as a witness network of the blockchain system, and the first service node and the second service node in the witness network are connected to the consensus node in the consensus network via the one or more routing proxy nodes in the routing proxy layer located between the service layer and the core consensus network layer, comprising:

at least one processor; and a storage apparatus, configured to store at least one program;

the at least one program, when executed by the at least one processor, causing the electronic device to implement a data synchronization method including:

receiving, by the first service node and via the one or more routing proxy nodes, block header data newly issued, according to the hierarchical structure, by the consensus node;

downloading, by the first service node and via the one or more routing proxy nodes, transaction hash data according to the block header data from the consensus node;

receiving, by the first service node and from the second service node, a first buffer mapping table of the second service node, the first buffer mapping table comprising a correspondence relationship between the transaction hash data and a local storage index of transaction content data at the second service node;

receiving, by the first service node according to the first buffer mapping table, the transaction content data stored in the storage index corresponding to the transaction hash data from the second service node; and synchronizing, by the first service node, the transaction hash data with the transaction content data.

9. The electronic device according to claim 8, wherein the method further comprises:
  determining, by the first service node, a second buffer mapping table of the first service node according to local transaction content data of the first service node;
  updating, by the first service node, the second buffer mapping table according to the transaction content data of the second service node when the transaction content data transmitted by the second service node is received; and
  transmitting, by the first service node, the updated second buffer mapping table to the second service node.

10. The electronic device according to claim 8, wherein the method further comprises:
  adding a third service node in a superior layer of the hierarchical structure as a father node of the first service node when the number of father nodes of the first service node is less than a threshold of the number of father nodes, or that connection between the first service node and the father nodes of the first service node fails; and
  adding a fourth service node in the superior layer of the hierarchical structure as the father node of the first service node when the adding the third service node in the superior layer as the father node of the first service node fails.

11. The electronic device according to claim 8, wherein the method further comprises:
  verifying, by the first service node, the block header data according to first block hash information of the block header data and second block hash information of target block header data, the target block header data being locally stored previous block header data of the block header data; and
  executing, by the first service node after the verification succeeds, the operation of downloading transaction hash data according to the block header data.

12. The electronic device according to claim 8, wherein the receiving, by the first service node and via the one or more routing proxy nodes, the block header data newly issued, according to the hierarchical structure, by the consensus node comprises:
  receiving, by the first service node and via the one or more routing proxy nodes, the block header data newly issued, through a father node of the first service node, by the consensus node;
  wherein the block header data is issued by the consensus node to the father node of the first service node according to the hierarchical structure.

13. The electronic device according to claim 8, wherein the consensus node comprises a first consensus node and a second consensus node; wherein the downloading, by the first service node, transaction hash data according to the block header data comprises:
  receiving, by the first service node according to the block header data, first transaction hash subdata issued, according to the hierarchical structure, by the first consensus node;
  receiving, by the first service node according to the block header data, second transaction hash subdata issued, according to the hierarchical structure, by the second consensus node, the first transaction hash subdata and the second transaction hash subdata being different; and
  integrating, by the first service node, the first transaction hash subdata and the second transaction hash subdata into the transaction hash data.

14. The electronic device according to claim 8, wherein the first service node and the second service node are service nodes located on a same layer in the hierarchical structure; wherein the receiving, by the first service node according to the first buffer mapping table, the transaction content data stored in the storage index corresponding to the transaction hash data from the second service node comprises:
  generating, by the first service node, a transaction content data request according to the storage index of transaction content data, corresponding to the transaction hash data, in the first buffer mapping table; and
  receiving, by the first service node by means of transmitting the transaction content data request to the second service node, the transaction content data returned by the second service node and corresponding to the transaction hash data.

15. A non-transitory computer-readable medium, storing a computer program, the computer program, when executed by a processor of an electronic device acting as a first service node of a blockchain system, the blockchain system comprising:
  a hierarchical structure comprising (i) a core consensus network layer including a consensus node, (ii) a routing proxy layer including one or more routing proxy nodes, and (iii) a service layer including a first service node and a second service node,
  the consensus node being a root node of the core consensus network layer in the hierarchical structure that acts as a consensus network of the blockchain system,
  the first service node and the second service node being descendant nodes of the consensus node in the service layer of the hierarchical structure that acts as a witness network of the blockchain system, and
  the first service node and the second service node in the witness network are connected to the consensus node in the consensus network via the one or more routing proxy nodes in the routing proxy layer located between the service layer and the core consensus network layer, causing the electronic device to implement a data synchronization method including:
  receiving, by the first service node and via the one or more routing proxy nodes, block header data newly issued, according to the hierarchical structure, by the consensus node;
  downloading, by the first service node and via the one or more routing proxy nodes, transaction hash data according to the block header data from the consensus node;
  receiving, by the first service node and from the second service node, a first buffer mapping table of the second service node, the first buffer mapping table comprising a correspondence relationship between the transaction hash data and a local storage index of transaction content data at the second service node;
  receiving, by the first service node according to the first buffer mapping table, the transaction content data stored in the storage index corresponding to the transaction hash data from the second service node; and
  synchronizing, by the first service node, the transaction hash data with the transaction content data.

16. The non-transitory computer-readable medium according to claim 15, wherein the method further comprises:
  determining, by the first service node, a second buffer mapping table of the first service node according to local transaction content data of the first service node;

updating, by the first service node, the second buffer mapping table according to the transaction content data of the second service node when the transaction content data transmitted by the second service node is received; and transmitting, by the first service node, the updated second buffer mapping table to the second service node.

17. The non-transitory computer-readable medium according to claim 15, wherein the method further comprises:

adding a third service node in a superior layer of the hierarchical structure as a father node of the first service node when the number of father nodes of the first service node is less than a threshold of the number of father nodes, or that connection between the first service node and the father nodes of the first service node fails; and adding a fourth service node in the superior layer of the hierarchical structure as the father node of the first service node when the adding the third service node in the superior layer as the father node of the first service node fails.

18. The non-transitory computer-readable medium according to claim 15, wherein the method further comprises:

verifying, by the first service node, the block header data according to first block hash information of the block header data and second block hash information of target block header data, the target block header data being locally stored previous block header data of the block header data; and executing, by the first service node after the verification succeeds, the operation of downloading transaction hash data according to the block header data.

19. The non-transitory computer-readable medium according to claim 15, wherein the receiving, by the first service node and via the one or more routing proxy nodes, the block header data newly issued, according to the hierarchical structure, by the consensus node comprises:

receiving, by the first service node and via the one or more routing proxy nodes, the block header data newly issued, through a father node of the first service node, by the consensus node;

wherein the block header data is issued by the consensus node to the father node of the first service node according to the hierarchical structure.

20. The non-transitory computer-readable medium according to claim 15, wherein the consensus node comprises a first consensus node and a second consensus node; wherein the downloading, by the first service node, transaction hash data according to the block header data comprises:

receiving, by the first service node according to the block header data, first transaction hash subdata issued, according to the hierarchical structure, by the first consensus node;

receiving, by the first service node according to the block header data, second transaction hash subdata issued, according to the hierarchical structure, by the second consensus node, the first transaction hash subdata and the second transaction hash subdata being different; and integrating, by the first service node, the first transaction hash subdata and the second transaction hash subdata into the transaction hash data.

* * * * *